United States Patent
Bryant

[11] 3,748,774
[45] July 31, 1973

[54] PLASTIC MINNOW

[76] Inventor: Sherman G. Bryant, Rt. No. 3, Lewisport, Ky. 42351

[22] Filed: Dec. 21, 1971

[21] Appl. No.: 210,469

[52] U.S. Cl. ............................................. 43/42.1
[51] Int. Cl. .......................................... A01k 85/00
[58] Field of Search ............... 43/42.1, 42.04, 42.24, 43/42.37, 42.38, 35, 42.33

[56] References Cited
UNITED STATES PATENTS

| | | | |
|---|---|---|---|
| 2,820,314 | 1/1958 | Scott | 43/42.1 |
| 2,994,982 | 8/1961 | Murawski | 43/35 |
| 3,561,151 | 2/1971 | Hoda | 43/35 |
| 2,665,515 | 1/1954 | Frantello | 43/42.33 |

Primary Examiner—Louis G. Mancene
Assistant Examiner—Gregory E. McNeill
Attorney—Harvey B. Jacobson

[57] ABSTRACT

A weedless artificial fishing lure designed and adapted to provide a self-shape-retaining minnow molded from plastic material and adapted to traverse the body of water in a desired bottom-bumping manner but which remains in a ture life-like upright position at all times. The lure proper is made of soft sinkable plastic. The complemental dorsal fin is made of floater plastic, the two parts being joined or bonded to achieve the constant upright swimming position while being retrieved or trolled. The hook is normally concealed but readied to function when the victim fish takes the minnow.

6 Claims, 5 Drawing Figures

PLASTIC MINNOW

The present invention relates to certain new and useful improvements in a soft plastic fishing minnow characterized by a concealed built-in conventional type fishing hook and wherein the component parts are oriented and coordinated in a manner to achieve the bottom-bumping weedless characteristics and, more particularly, to so construct and balance the lure that it will assume a true life-like upright position at all times when in use.

The state of the art to which the present invention pertains may be evaluated in part by taking into account the general applicability of the artificial fish bait in a patent to Kyujiro Ono, U.S. Pat. No. 1,723,557 showing the use of interlinked diametrically opposite button-like eyes. While the herein disclosed lure reveals similarly mounted eyes, the primary purpose of the floater eyes here is to assist in maintaining or holding the lure in an upright position, appearance being a secondary function. The use of a bottom weighted fishing lure construction is disclosed in a patent to Delmer D. Scott, U.S. Pat. No. 2,820,314 and which, in addition, shows hooks with embedded barbed projectable points. The Scott patent is thought to be of general interest only. The patent to John W. Albers et al., U.S. Pat No. 1,846,538 may be referred to for background purposes in that it shows a plastic imitation minnow with self-contained hook means with the barbed hooks normally concealed but projectable and retractable.

An object of the herein disclosed lure is to improve upon structurally and functionally analogous artificial lures and, in so doing, to provide enthusiastic anglers with an innovation which better and more satisfactorily serves the purposes for which it has been skillfully devised and effectually and acceptably utilized.

Another aspect of the instant improved lure is to provide a simple and expedient two-part lure wherein the component parts, the body proper made of soft plastic and the complemental dorsal fin made of floater plastic, lend themselves to mass production procedures and wherein the component parts may be purchased in a retail store in quantities of more than one at an attractive and reasonable cost unrigged and capable of being subsequently rigged by the purchaser to tie-in with and suit his own personal desires and wherein the component parts are also such that the finished product can be completed by the manufactured and readied for sale and use.

Briefly the unique lure is characterized by a one-piece body portion, a forward end head portion and a rearward trailing tail portion. The body portion has upper and lower dorsal and ventral lengthwise marginal edges and appropriate left and right side portions, the overall body, head and tail portions being constructed of squeezably soft but sinkable plastic material. The dorsal edge portion at its center is provided with a mortised or suitably formed pocket or cavity for reception of a telescoping anchorable portion of an upstanding properly proportioned fin made of floater plastic, the fin and body portions being connected by the natural adhesion properties of the plastic materials or, if preferred, by appropriately applied adhesive media. More explicitly, the longitudinally grooved body and ventral portion provides the desired channel or groove for a major portion of a conventional hook and functions in such a manner that the offset barbed bill portion has its point embedded just below the peripheral surface in readiness to project and make the catch when the lure is taken by the victim fish.

It is reiterated, by introduction to the more detailed description, that the use and compounding of appropriately selected commercial plastics (sinkable and floatable) in the lure shown and described facilitate achievement of a significant improved result in that the finished lure when in use is maintained in an upright position for both attraction and fish-catching results.

Then, too, it is a feature of the overall product to pave the way for the utilization of eyes which are made of hard or semi-hard floater plastic material and which are fashioned in such a manner that enables them to be "button-holed" into the soft flexible plastic surfaces of the minnow and to so countersink themselves to achieve the snag-proof result and wherein at the same time the floater eyes become a buoyant force that assists in holding the minnow in its upright effectually functioning state.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

By way of further introduction to the description of the details, it is significant to mention that since most plastic animated lure forms are preferably such as to maintain an upright position in order to imitate the live swimming motions of bait such as frogs, lizards and the like, it is believed to be self-evident that there exists a need to produce a lure that will hold this upright position at all times and so that when action is applied it will come through the water in a so-called bottom-bumping true-life upright position. Accordingly, an attacking fish is more likely to take this type of a lure. It is significant to note too that many prior art plastic animated lures are often found to be virtually useless because of their inability to imitate the swimming motion of a properly traveling upright lure.

Figure 1:
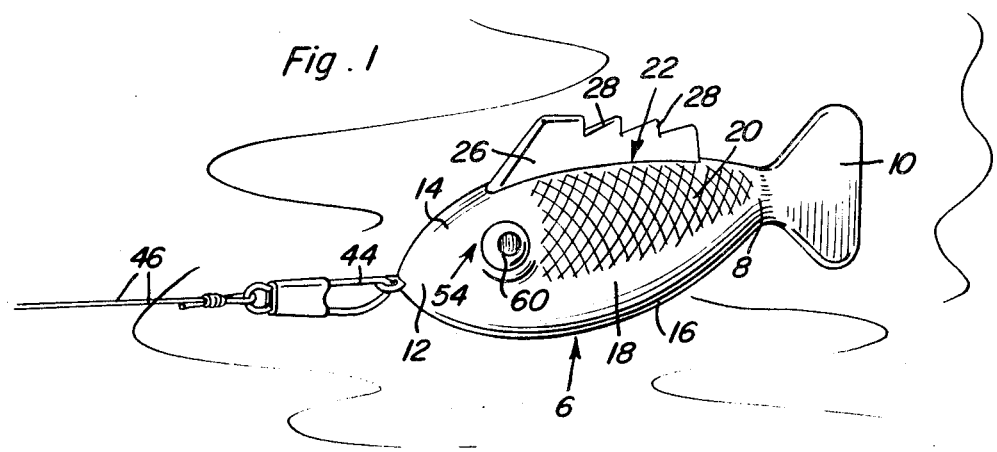
FIG. 1 is a view in perspective of a plastic artificial minnow rigged and ready for use and constructed in accordance with the principles of the present invention.

Referring now to the views of the drawing, and particularly to FIGS. 1 through 4, it will be seen that the lure proper denoted generally at 6 in FIG. 1 is to be made of soft sinkable plastic material of a type having the desired compressibly resilient and squeezable properties. The main or body portion has a rearward end portion 8 tapering and merging into an appropriately shaped tail portion 10. The nose-equipped head portion at the forward or leading end is denoted by the numeral 12. The upward lengthwise dorsal edge is designated at 14 and the lower belly or ventral edge is denoted at 16. The opposed convex left and right sides are denoted at 18. The lower half portions of the sides are smooth. The upper median half portions are milled, lined or grooved in criss-cross fashion or otherwise knurled or embossed to provide scale-like surfaces 20.

A centralized part of the dorsal edge is provided with an elongated shallow recess or cavity 22 providing a pocket for a coacting telescoping basal portion 24 of a block-like insert 26 which constitutes a dorsal fin. The stepped or graduated fins on the upwardly projecting top edge portion are denoted at 28. It is within the purview of the concept to rely upon the inherent adhesive properties of the respective plastic materials to join the fin and body portion together or, if preferred, to resort to extra adhesive media to join the parts in a more secure fashion. In either event the dorsal fin means is made of floater plastic while the minnow proper 6 is made of an appropriate soft-sinkable plastic.

Figure 2:
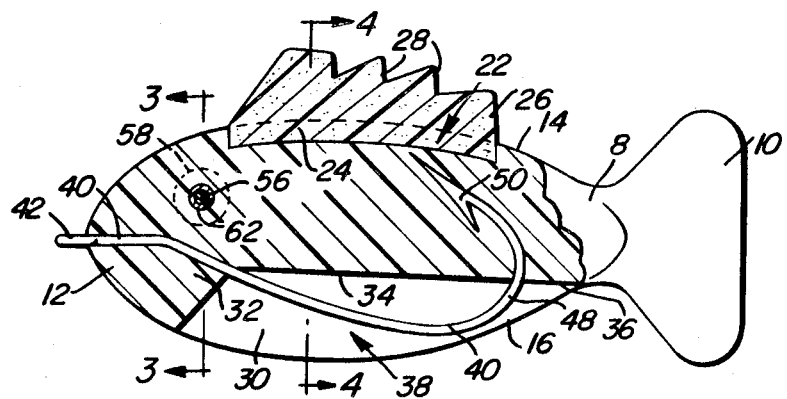
FIG. 2 is a central longitudinal sectional view with parts appearing in section and elevation.

The major underneath side of the lure 6 which is herein designated as the ventral area is provided with an elongated relatively deep groove or channel 30 (FIG. 2). The bottom of the channel 30 opens through the ventral side and the left hand or forward end portion is oblique-angled and closed as at 32. The upper part of the channel is also closed at 34 while the rearward end portion 36 opens through that part 8 which may also be designated as the junctional portion between the tail and body portions.

The fishhook of a substantially conventional type is denoted by the numeral 38 and includes an elongated shank 40 concealed and seated in the groove or channel 30 and the forward end portion 42 passes through and beyond the head where it terminates in a line-attaching eye 42 to accommodate a fastener 44 to which the fishing line 46 is connected (FIG. 1). The curvate return bend or bent portion of the hook 38 at the right in FIG. 2 is denoted at 48 and terminates in a barbed or pointed bill portion 50. As brought out in FIG. 4 this barbed bill portion is offset to the right so that the barb can be embedded in the plastic material with the point so situated in relation to the peripheral surface that it is in readiness to be projected when the bait is taken by the victim fish.

Figure 3:
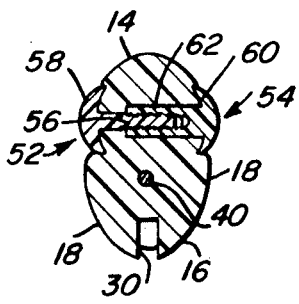
FIG. 3 is a transverse section taken on the vertical section line 3—3 of FIG. 2 looking in the direction of the indicating arrows.
Figure 4:
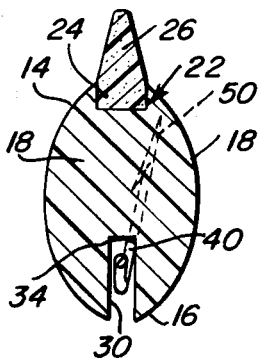
FIG. 4 is a similar view but taken on the vertical section line 4—4 of FIG. 2.

The eye means in FIG. 3 can be of composite construction and made of interconnectible component parts 52 and 54. The part 52 has a screw-threaded shank 56 terminating at its outer end in a concavo-convex head 58 whose concave side is embedded in the soft plastic to render it weedless. The component unit or part 54 also has a similar concavo-convex head 60 which is likewise embedded and which has a screw-threaded socket member 62 into which the screw-threaded shank 56 is adjustingly screwed so that the units can be screwed together to bind the button-like heads securely in their intended positions (FIG. 3).

Figure 5:
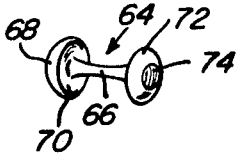
FIG. 5 is a view in perspective of one form of eye means (semi-hard floater plastic) which is designed and adapted for use under certain assembling and performing conditions.

It is within the purview of the invention to use a one-piece dual head means of the type designated at 64 in FIG. 5 and comprising a shank 66 having a cupped or concavo-convex head 68 at one end with its convex side 70 adapted to be embedded in the plastic surface. A similar concavo-convex head 72 is on the other end of the shank and it too is likewise embedded as suggested in FIG. 3. The pupil of the eye in each instance is denoted at 74. With this one-piece construction it is possible to simply shove or thrust the unit through a bore provided therefor in a substantially self-evident manner. It is reiterated that the use of distinguishably different plastic materials sinkable and floater type in this unique plastic animated fishing lure permits the eye means to serve not only for attraction purposes but for relative buoyant purposes too.

It is submitted that the manner in which the individual component parts are constructed and the way in which they are oriented and coordinated to provide the finished product is evident from the views of the drawing taken in conjunction with the description. Accordingly a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An artificial weedless-type fishing lure comparable to and imitative of a live minnow and capable of being fished in a constantly upright animated position on the bottom of a body of water comprising: a body portion, forward end head portion and rearward tail portion, said body portion having dorsal, ventral, and side portions, the overall body, head and tail portions being made of compressibly resilient squeezably soft sinkable plastic material, a dorsal fin made of soft relatively buoyant floater plastic, a fishhook, the major lengthwise ventral portion of said body portion being molded with a longitudinal groove ranging from the head portion toward the tail portion, said groove being closed along its top, closed at its forward head end and opening through said ventral portion and also at the juncture of the tail and body portions and providing a pocket in which the shank and hook portions of said fishhook are protectively sheathed and concealed, said dorsal fin comprising an elongated insert having a portion thereof retentively fitted into a mortise-like cavity formed therefor in a median portion of said dorsal portion, the retentively fitted portion of said insert being adhesively and securely retained in said pocketing cavity.

2. The fishing lure defined in and according to claim 1, and wherein the upper half-portions of the respective sides are milled with criss-cross lines defining and representing fish scales.

3. An artificial weedless-type fishing lure comparable to and imitative of a live minnow and such that it may be fished in a constantly upright position on the bottom of a body of water comprising: an elongated body portion, a forward head portion and a rearward tail portion, said body portion having an upper lengthwise dorsal edge, a lower lengthwise ventral edge, and complemental side portions, the overall body, head and tail portions being made of compressibly resilient squeezably soft sinkable plastic material, a median part of said upper dorsal edge having an elongated cavity, an elongated dorsal fin made of buoyantly floatable plastic material and having a lengthwise basal portion telescopingly fitted and retentively seated in said cavity and an upper lengthwise portion projecting above said dorsal edge, the lower ventral edge having an elongated groove closed at a forward end, closed along an upper end, open at its lower end and opening through the ventral surface and open at a rear end adjacent said tail portion, a fishhook having a shank embedded in the head portion and terminating in an accessibly exposed line-attaching eye, said shank being provided at a rearward end with a return bend terminating in a laterally offset pointed barb, said barb being embedded in a vulnerable surface portion of one side of the body portion whereby to be projected when the body portion is squeezed by an attracted fish.

4. The lure according to claim 3, and wherein said upper projecting portion has a longitudinal upper edge provided with graduated teeth-like top fins.

5. The lure according to claim 4, and eye means removably mounted on and constituting a complemental component of said head, said eye means being made of semi-hard floater plastic material, said eye means being buoyant and cooperating with said dorsal fin and assisting the same in maintaining the overall minnow in said upright position.

6. The lure defined in claim 5, and wherein said eye means comprises a shank passing through a bore provided therefor in the head portion of said body, said shank having end portions provided with integral concave-convex button-like heads, the concave sides of said heads firmly abutting the respectively cooperable side surfaces of said head portion.

* * * * *